United States Patent
Nakamura et al.

(12) 
(10) Patent No.: US 8,796,891 B2
(45) Date of Patent: Aug. 5, 2014

(54) BRUSHLESS DC MOTOR

(75) Inventors: Manabu Nakamura, Kitasaku-gun (JP); Yuzuru Suzuki, Kitasaku-gun (JP)

(73) Assignee: Minebea Co., Ltd., Nagano (JP)

( * ) Notice: Subject to any disclaimer, the term of this patent is extended or adjusted under 35 U.S.C. 154(b) by 479 days.

(21) Appl. No.: 13/072,369

(22) Filed: Mar. 25, 2011

(65) Prior Publication Data

US 2011/0241499 A1  Oct. 6, 2011

(30) Foreign Application Priority Data

Mar. 30, 2010  (JP) ................................ 2010-077701

(51) Int. Cl.
  *H02K 29/00* (2006.01)
  *H02K 29/03* (2006.01)
  *H02K 29/10* (2006.01)

(52) U.S. Cl.
  CPC ............... *H02K 29/03* (2013.01); *H02K 29/10* (2013.01)
  USPC .......................................... 310/67 R; 310/89

(58) Field of Classification Search
  USPC ........... 310/68, 156.05, 156.06, 89, 40 MMR
  See application file for complete search history.

(56) References Cited

U.S. PATENT DOCUMENTS

| 4,529,900 A | * | 7/1985 | Uzuka .............................. 310/43 |
| 4,604,665 A | * | 8/1986 | Muller et al. .............. 360/99.23 |
| 4,952,830 A | * | 8/1990 | Shirakawa .................. 310/68 B |
| 5,808,390 A | | 9/1998 | Miyazawa et al. |
| 5,996,209 A | * | 12/1999 | Molnar et al. .................. 29/596 |
| 6,166,470 A | | 12/2000 | Miyazawa et al. |
| 2006/0181164 A1 | * | 8/2006 | Ho et al. ...................... 310/67 R |
| 2007/0046122 A1 | | 3/2007 | Makiuchi et al. |
| 2008/0012443 A1 | | 1/2008 | Tamaoka et al. |

FOREIGN PATENT DOCUMENTS

| JP | A-59-011748 | 1/1984 |
| JP | U-3-120675 | 12/1991 |
| JP | A-2002-291194 | 10/2002 |
| JP | A-2004-297903 | 10/2004 |
| JP | A-2005-057855 | 3/2005 |
| JP | A-2007-060844 | 3/2007 |
| JP | 2008-005623 | 1/2008 |
| WO | WO 93/10593 | 5/1993 |

OTHER PUBLICATIONS

Oct. 3, 2013 Office Action issued in Japanese Application No. 2010-077701 (w/ English Translation).

* cited by examiner

*Primary Examiner* — Tran Nguyen
(74) *Attorney, Agent, or Firm* — Oliff PLC

(57) ABSTRACT

A brushless DC motor is provided and includes: a stator assembly; a rotor assembly including a sleeve; a case assembly; and a circuit board assembly which has an electronic component mounted thereon. The case assembly is provided with an opening, the electronic component passes through the opening so as to protrude inside the case assembly, and a groove is formed at an axial end of the sleeve of the rotor assembly in order to prevent the electronic component from making contact with any part of the rotor assembly. Thus, the axial dimension of the brushless DC motor that includes the electronic component disposed to protrude inside the case assembly can be successfully reduced in such a manner that the electronic component is accommodated within the groove. Further, no electronic component is disposed around the outer circumference of the stator assembly and therefore the radial dimension also can be kept small.

2 Claims, 5 Drawing Sheets

BRUSHLESS DC MOTOR

BACKGROUND OF THE INVENTION

1. Field of the Invention

The present invention relates to a brushless DC motor, and more particularly to a brushless DC motor in which electronic components necessary for rotary drive are built-in and at the same time which has a reduced dimension in the axial direction.

2. Description of the Related Art

Motor structures, in which electronic components are provided as constituent parts of a motor in a unified manner, are conventionally known. For example, Japanese Patent Application Laid-Open No. 2002-291194 discloses a brushless DC motor which includes electro components arranged around the outer circumference of a rotor assembly. Also, Japanese Patent Application Laid-Open No. 2007-60844 teaches a motor structure which is configured such that electronic components are located to overlap with a rotor magnet with respect to the axial direction so as to sandwich a motor case. Further, Japanese Patent Application Laid-Open No. 2005-57855 describes a brushless DC motor which is structured such that openings are provided at an upper housing of the brushless DC motor, wherein a hall element which is fixedly mounted on a circuit board is adapted to oppose the upper face of a rotor assembly through the openings.

The conventional motor structures described above, however, have the following problems. In the motor described in Japanese Patent Application Laid-Open No. 2002-291194, in which electronic components are arranged around the outer circumference of a rotor assembly, the radial dimension of the motor cannot be reduced. On the other hand, the motor structure described in Japanese Patent Application Laid-Open No. 2007-60844, which is configured such that electronic components are located outside a motor case, has advantage in that the radial dimension can be kept small but is disadvantageous in that the axial dimension (motor height) has to be increased. In the meantime, Japanese Patent Application Laid-Open No. 2005-57855 does not refer to any motor structure in which electronic components are arranged as constituent parts inside a housing member and at the same time are prevented from interfering with a rotor assembly.

SUMMARY OF THE INVENTION

The present invention has been made in light of the problems described above, and it is an object of the present invention to provide a brushless DC motor in which electronic components are included as constituent parts in a unified manner and the same time in which both the radial dimension and the axial dimension are reduced.

In order to achieve the object described above, according to an aspect of the present invention, there is provided a brushless DC motor that includes: a stator assembly which includes a stator core shaped annular and having a plurality of pole teeth disposed at the inner circumference thereof, and which includes also a plurality of coils wound respectively around the pole teeth; a rotor assembly which is disposed inside the stator assembly with an air gap from the stator assembly and which includes a rotor shaft, a sleeve which has a disk-like shape, is disposed around the rotor shaft and which has a groove formed at an axial end thereof so as to axially recess, and a permanent magnet which is disposed around the sleeve; a case assembly which is adapted to house the stator assembly and the rotor assembly and which includes a case body having a disk-like main plate provided with an opening; and a circuit board assembly which is disposed axially outward of the case assembly and which includes a circuit board and an electronic component mounted on the circuit board so as to pass through the first opening of the case assembly and to protrude axially inward of the case assembly, wherein a part of the electronic component is located within the groove of the sleeve of the rotor assembly.

With the structure described above, the electronic component mounted on the circuit board passes through the opening of the case body and protrudes inside the case assembly, and at the same time the groove formed at the axial end of the sleeve of the rotor assembly is adapted to accommodate a part of the electronic component protruding inside the case assembly, whereby the electronic component is prevented from interfering with the rotor assembly. Specifically, the part of the electronic component protruding inside the case assembly, which conventionally would interfere with the rotor assembly, can be free from contact therewith thanks to the groove formed at the sleeve. Accordingly, the brushless DC motor, while including the electronic component inside the case body, can have a reduced axial dimension.

Also, since the electronic component can be located radially inside of the stator assembly, the radial dimension can be kept small. Further, since the groove is formed at the sleeve, rather than at the magnet of the rotor assembly, the volume of the magnet is not reduced and thus it is prevented that the motor performance is sacrificed for the sake of reducing the entire motor size.

In the aspect of the present invention, the brushless DC motor described above may include one electronic component or a plurality of electronic components. The electronic component may be a sensor element, such as an IC, transistor, diode, capacitor, inductor, resistive element, magnetic sensor, and the like. The number of pole teeth and the number of magnets are not limited to a specific figure.

In the aspect of the present invention, the main plate of the case body may be further provided with a plurality of openings adapted to house the coils of the stator assembly.

In the aspect of the present invention, the circuit board may be double sided and may include an electrode terminal which is disposed on a side thereof exposed to the outside and which is adapted to make an electrical connection with an external source.

In the aspect of the present invention, the brushless DC motor may further include a spacer ring which is disposed in contact with the stator assembly and which includes a protrusion extending toward the circuit board and having winding ends of the coils bound therearound, wherein the main plate of the case body is still further provided with an opening through which the protrusion of the spacer ring passes, and wherein the circuit board includes a cutout which houses the protrusion of the spacer ring to thereby enable the protrusion to communicate with a side of the circuit board having the electrode terminal disposed thereon, whereby a portion of the protrusion of the spacer ring which has the winding ends of the coils bound therearound is housed in the cutout of the circuit board such that the winding ends of the coils are electrically connected to the circuit board.

In the structure or arrangement described above, the protrusion of the spacer ring, which has the winding ends of the coils bound therearound, passes through the opening of the case body so as to be lodged in the cutout of the circuit board, wherein the winding ends of the coils bound around the protrusion of the spacer are connected to the circuit board by soldering or the like, whereby the coils and the circuit board are electrically connected to each other. This connecting work can be easily accomplished at the side of the circuit board exposed to the outside.

According to the present invention, while the brushless DC motor has the electronic component therein, the axial dimension of the brushless DC motor can be kept small Also, in the brushless DC motor, the coils of the stator assembly are prevented from interfering with the case assembly thanks to the provision of the openings to house the coils, which contributes to further reducing the axial dimension of the motor.

Further, the disposition of the electrode terminal at the side of the circuit board exposed to the outside allows an external wiring to be easily connected to the brushless DC motor.

DETAILED DESCRIPTION OF THE INVENTION

Exemplary embodiments of the present invention will hereinafter be discussed in conjunction with the accompanying drawings.

Figure 1:
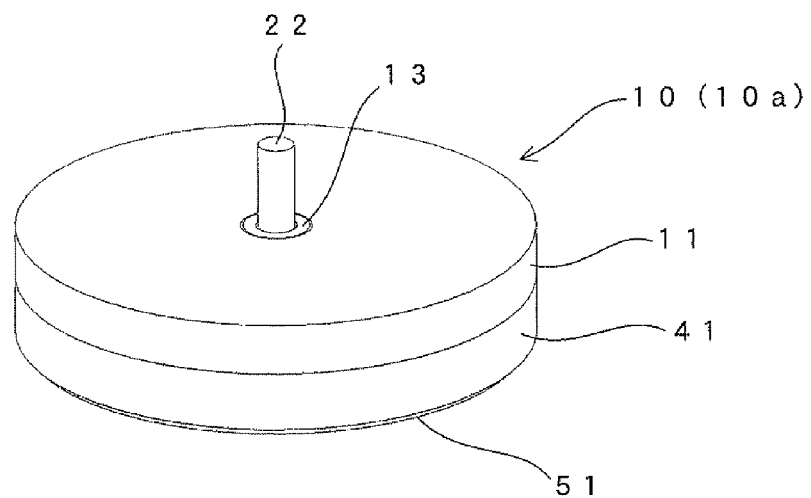
FIG. 1 is a perspective view of a brushless DC motor according to a first embodiment of the present invention.
Figure 2:
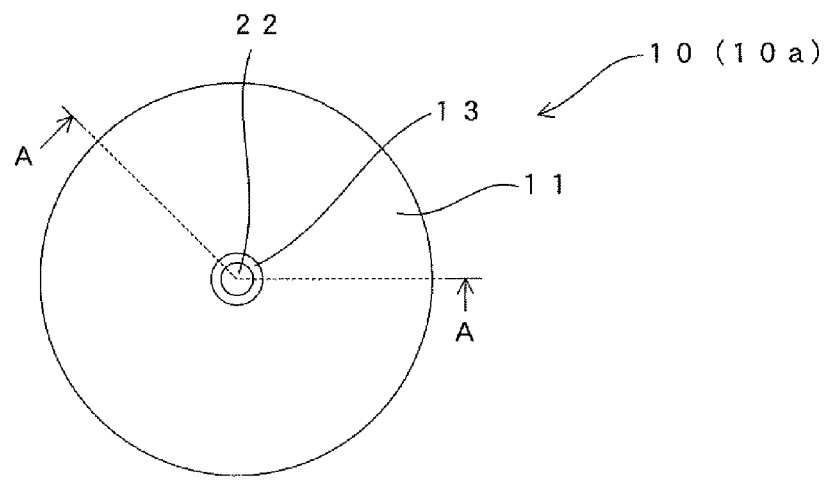
FIG. 2 is an elevation view (top plan view) of the brushless DC motor of FIG. 1, taken in the axial direction.
Figure 3:
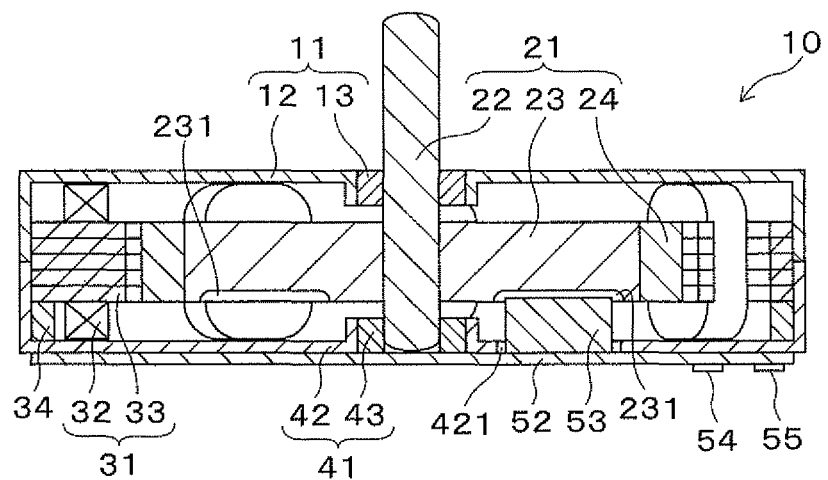
FIG. 3 is an axial cross-sectional view of the brushless DC motor according to the first embodiment.
Figure 4:
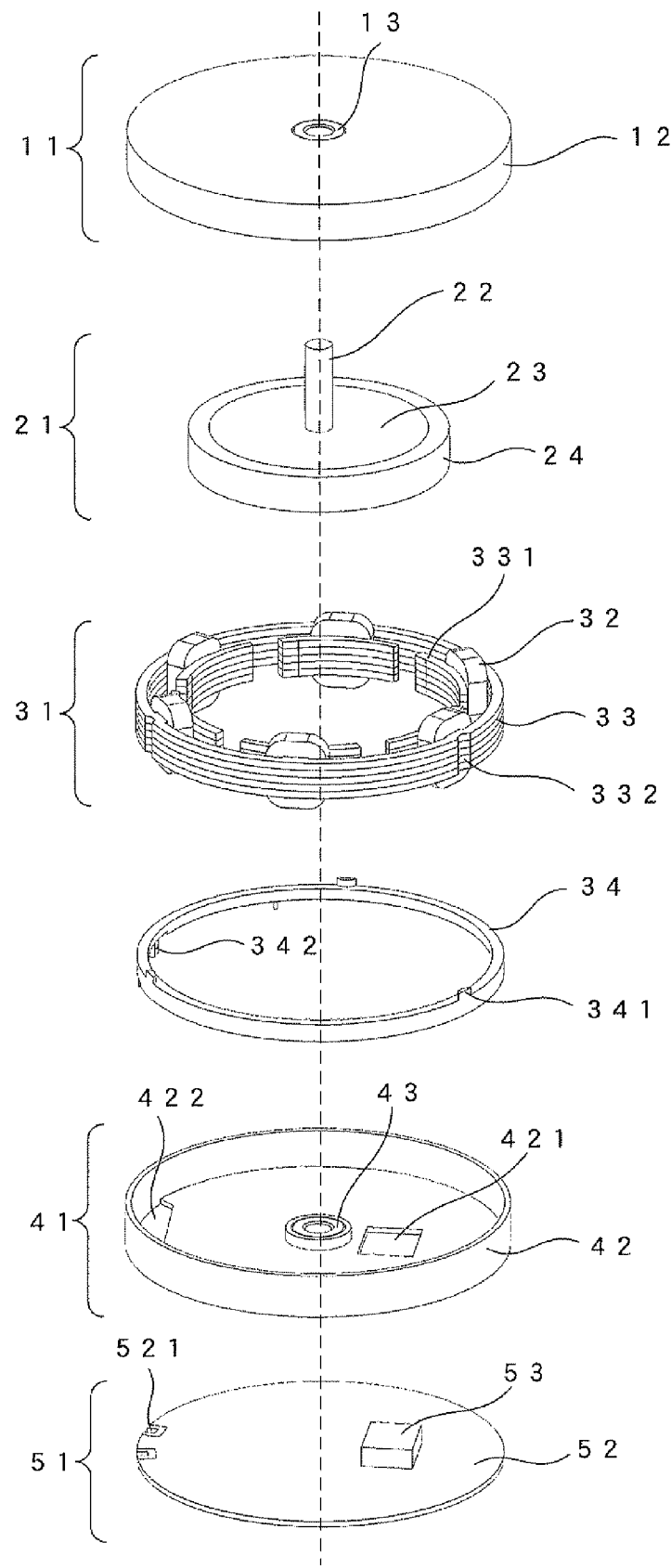
FIG. 4 is a perspective exploded view of the brushless DC motor according to the first embodiment.

A first embodiment of the present invention will be described with reference to FIGS. 1 to 4 which illustrate a brushless DC motor 10 according to the first embodiment of the present invention, wherein FIG. 1 shows a perspective view, FIG. 2 shows a top plan view taken in the axial direction, FIG. 3 shows a cross-sectional view taken along line A-A in FIG. 2, and FIG. 4 shows an axially exploded view.

Referring to FIGS. 1 to 4, the brushless DC motor 10 includes a cover assembly 11, a rotor assembly 21, a stator assembly 31, a spacer ring 34, a case assembly 41, and a circuit board assembly 51.

The circuit board assembly 51 is disposed at the bottom of the brushless DC motor 10 and includes a double-sided circuit board 52 and an electronic component 53 mounted on an inner side of the circuit board 52 facing inwardly of the brushless DC motor 10.

The electronic component 53 is an IC (integrated circuit) to function to supply a driving current to stator coils (to be described later). In this connection, some electronic components other than the electronic component 53 are mounted, though not illustrated. The electronic component 53 is arranged and located, when viewed in the axial direction, so as not to overlap with a magnet 24 of the rotor assembly 21 but to overlap with a sleeve 23 of the rotor assembly 21.

A cutout 521 is formed at the rim of the circuit board 52. The cutout 521 is adapted to accommodate a first protrusion 342 of the spacer ring 34 (to be described later) so that the first protrusion 342, which is formed to extend axially toward the circuit board 52, can communicate with a side (lower side in the figure, on which electrode terminals 54 and 55 to connect outside electrical signals to the circuit board 52 are provided) of the circuit board 51, whereby the first protrusion 342 of the spacer ring 34 can be connected to the electrode terminals 54 and 55 by soldering. An electrode pattern to communicate with a circuit of the circuit board 52 is formed around the cutout 521.

Referring to FIG. 3, the side (lower side in FIGS. 3 and 4 facing axially outward to be exposed to the outside) of the circuit board 52, which is opposite to the side thereof having the electronic component 53, is provided with the aforementioned electrode terminals 54 and 55. While two electrode terminals (54 and 55) are provided in the embodiment shown in FIG. 3, the number of electrode terminals provided is not limited to two but varies according to the requirement. A control wiring to pass a control signal for controlling the drive of the brushless DC motor 10 and also a power supply wiring are connected to the electrode terminals 54 and 55.

The circuit board 52 of the circuit board assembly 51 is attached, by means of adhesive or the like, to the outer face (lower side in the figure) of a main plate of a case body 42 of the case assembly 41 which is a lower housing member of the brushless DC motor 10. In this connection, the case body 42 is constituted by the aforementioned main plate having a disk-like shape and by an annular wall.

Referring to FIG. 4, the case body 42 includes an opening 421 formed at a portion of the main plate positioned corresponding to the electronic component 53, whereby the electronic component 53 is prevented from interfering with the case body 42. Specifically, when the circuit board 52 of the circuit board assembly 51 is attached to the main plate of the case body 42, the electronic component 53 goes through the opening 421 and protrudes toward the rotor assembly 21, that is to say, protrudes inside the brushless DC motor 10. A rear bearing 43 is attached at the center of the main plate of the case body 42 and one end (rear end) of a rotor shaft 22 of the rotor assembly 21 is rotatably supported by the rear bearing 43.

Referring also to FIG. 4, there is provided another opening 422 formed at the rim of the main plate of the case body 42 such that the first protrusion 342 of the spacer ring 34 goes therethrough to reach into the cutout 521 of the circuit board 52. The opening 422 is sized to be large enough so that the first protrusion 342 of the spacer ring 34 around which winding ends of coils 32 of the stator assembly 31 are bound can duly pass through toward the circuit board 52.

The spacer ring 34 and the stator assembly 31 are axially connected to each other. The stator assembly 31 includes a stator core 33. The stator core 33 has a substantially ring shape and includes six pole teeth 331 provided at the inner circumference thereof so as to extend radially inwardly. The aforementioned coil 32, which functions as a stator coil (driving coil), is wound around each of the pole teeth 331 so as to have a winding layer thickness protruding axially from the stator core 33, wherein the spacer ring 34 has an axial dimension substantially equal to the winding layer thickness of the coil 32 (refer to FIG. 3).

A plurality (three in the embodiment) of groove-shaped recesses 332 axially running are provided at the outer circumference of the stator core 33. A plurality (three in the embodiment) of second protrusions 341 which are formed on the spacer ring 34 so as to axially extend toward the stator core 33 are engaged with the plurality of recesses 332 of the stator core 33, whereby the stator assembly 31 and the spacer ring 34 are joined to each other.

The spacer ring 34 is shaped substantially annular and fitted to the stator assembly 31 as described above and firmly determines and holds the position of the case assembly 41 relative to the stator assembly 31. The spacer ring 34, as described above, includes the first protrusion 342 which extends axially toward the case body 42.

The winding ends of the coils 32 of the stator assembly 31 are bound around the first protrusion 342 of the spacer ring 34. The first protrusion 342 having the winding ends of the coils 32 bound therearound goes through the opening 422 of the case body 42 and is lodged in the cutout 521 of the circuit board 52, the situation of which is seen at the cutout 521 from the bottom side in FIG. 3, wherein the winding ends of the coils 32 are electrically connected, by means of soldering or the like, to the electrode pattern of the circuit board 52 formed around the cutout 521.

A joint assembly structured such that the stator assembly 31 and the spacer ring 34 are joined together as described above is lodged in the case body 42, and one end (rear end) of the rotor shaft 22 of the rotor assembly 21 is inserted through the rear bearing 43 of the case assembly 41 so as to be rotatably supported, whereby the rotor assembly 21 is attached to the case assembly 41 in a rotatable manner.

The rotor assembly 21 is constituted by the earlier mentioned rotor shaft 22, the earlier mentioned sleeve 23 having a disk-like shape and attached around the rotor shaft 22, and the earlier mentioned magnet (permanent magnet) 24 which is magnetized with multiple poles and attached around the sleeve 23. The rotor assembly 21 is disposed inside the stator assembly 31 with an air gap therebetween and supported rotatable with respect to the stator assembly 31, wherein the magnet 24 of the rotor assembly 21 is adapted to oppose the pole teeth 331 of the stator assembly 31.

An annular groove 231 configured to axially recess is formed at an axial end of the sleeve 23 of the rotor assembly 21 so as to face the electronic component 53 (refer to FIG. 3). The annular groove 231 is arranged to be located such that the electronic component 53 axially overlaps the sleeve 23 so as to oppose the annular groove 231 constantly when the rotor assembly 21 is rotated, wherein a part (top portion) of the electronic component 53 is located within the annular groove 231 and is thereby prevented from making contact with any part of the sleeve 23 during the rotation of the rotor assembly 21. Thus, the annular groove 231 functions to prevent interference between the sleeve 23 and the electronic component 53 at the rotation of the rotor assembly 21.

The cover assembly 11 which serves as an upper housing member of the brushless DC motor 10 includes a cover body 12 composed of a disk-like main plate and an annular wall, and a front bearing 13 disposed at the center of the main plate. The front bearing 13 supports the other end (front end) of the rotor shaft 22 rotatably.

The cover assembly 11 described above is attached to the case assembly 41 by adhesive or the like such that the annular wall of the cover body 12 is joined to the annular wall of the case body 42. The brushless DC motor 10 shown in FIG. 1 is structured as described above.

The spacer ring 34, which is employed in the embodiment described above, is not essential to the present invention and may be omitted on the condition that the case assembly 41 can be firmly held in position relative to the stator assembly 31 by other means.

The brushless DC motor 10 according to the first embodiment has the following advantages. In the brushless DC motor 10, the opening 421 is formed at the case body 42, and the electronic component 53 mounted on the circuit board 52 is adapted to go through the opening 421 and to partly protrude into the case body 42. Specifically, the top portion of the electronic component 53 protrudes into the case body 42 so as to be positioned within the annular groove 231 formed at the sleeve 23 of the rotor assembly 21, wherein the electronic component 53 is prevented from interfering with the sleeve 23 when the rotor assembly 21 is rotated.

With the structure described above, the axial dimension of the brushless DC motor 10 is determined by the sum of the thickness of the main plate of the cover body 12, the axial dimension of the coil 32, the thickness of the main plate of the case body 42, and the thickness of the circuit board 52.

Since the brushless DC motor 10 is structured such that the opening 421 is formed at the case body 42 and that the annular groove 231 is formed at the sleeve 23 of the rotor assembly 21, the electronic component 53 can be located interiorly of the brushless DC motor 10 without making contact with any part of the rotor assembly 21.

Also, since the annular groove 231 is formed at the sleeve 23 of the rotor assembly 21 adapted to fixedly hold the magnet 24 while the electronic component 53 is located so as not to axially overlap with the magnet 24 of the rotor assembly 21, the magnet 24 does not undergo reduction in volume, which contributes to preventing deterioration of the motor performance.

Consequently, a brushless DC motor can be provided which includes a circuit board in a unified manner and at the same time which can have a reduced axial direction dimension without deteriorating its performance. Also, no electronic components are arranged around the outer circumference of the stator assembly 31, and therefore the radial direction dimension can be kept small.

Further, since the circuit board 52 is double sided and since the electrode terminals 54 and 55 are provided at a side (lower side in FIG. 3) of the circuit board 52 exposed to the outside, the exterior wiring can be connected to the brushless DC motor 10 without the necessity that the wiring provided in the brushless DC motor 10 is pulled out outside a motor case. This is advantageous in saving labor for connecting wires as well as in reducing component cost.

A second embodiment of the present invention will now be described with reference to FIGS. 5 and 6 in addition to FIGS. 1 and 2. The second embodiment is intended to provide a brushless DC motor which is structured such that a stator coil is prevented from interfering with a motor case to thereby further reduce the axial dimension.

A brushless DC motor 10a according to the second embodiment of the present invention has substantially the same appearance as the brushless DC motor 10 according to the first embodiment as shown in FIGS. 1 and 2. FIG. 5 shows a cross-sectional view of the brushless DC motor 10a according to the second embodiment taken along the same line A-A (refer to FIG. 2) as FIG. 3 for the first embodiment and FIG. 6 shows an axially exploded view of the brushless DC motor 10a.

The description hereafter will be focused on the differences from the brushless DC motor 10 according to the first embodiment, wherein identical or corresponding parts are denoted by the same reference number as in the description of the first embodiment.

Figure 5:
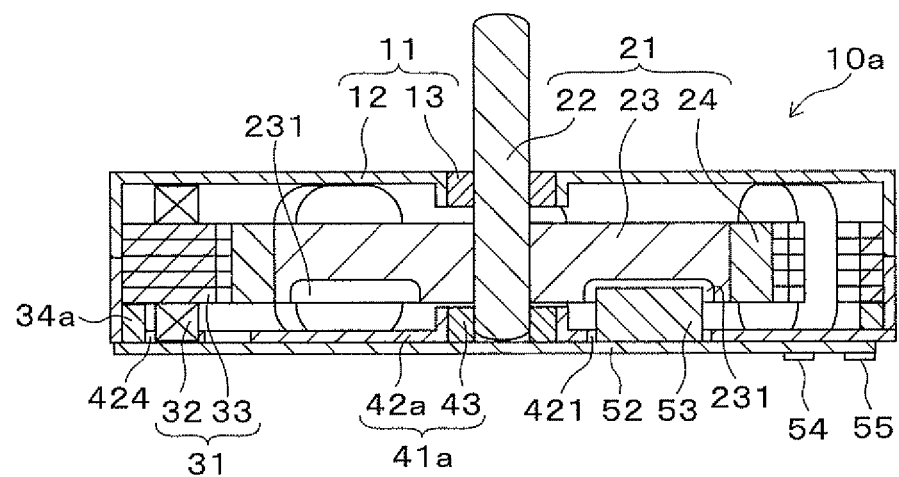
FIG. 5 is an axial cross-sectional view of a brushless DC motor according to a second embodiment of the present invention.
Figure 6:
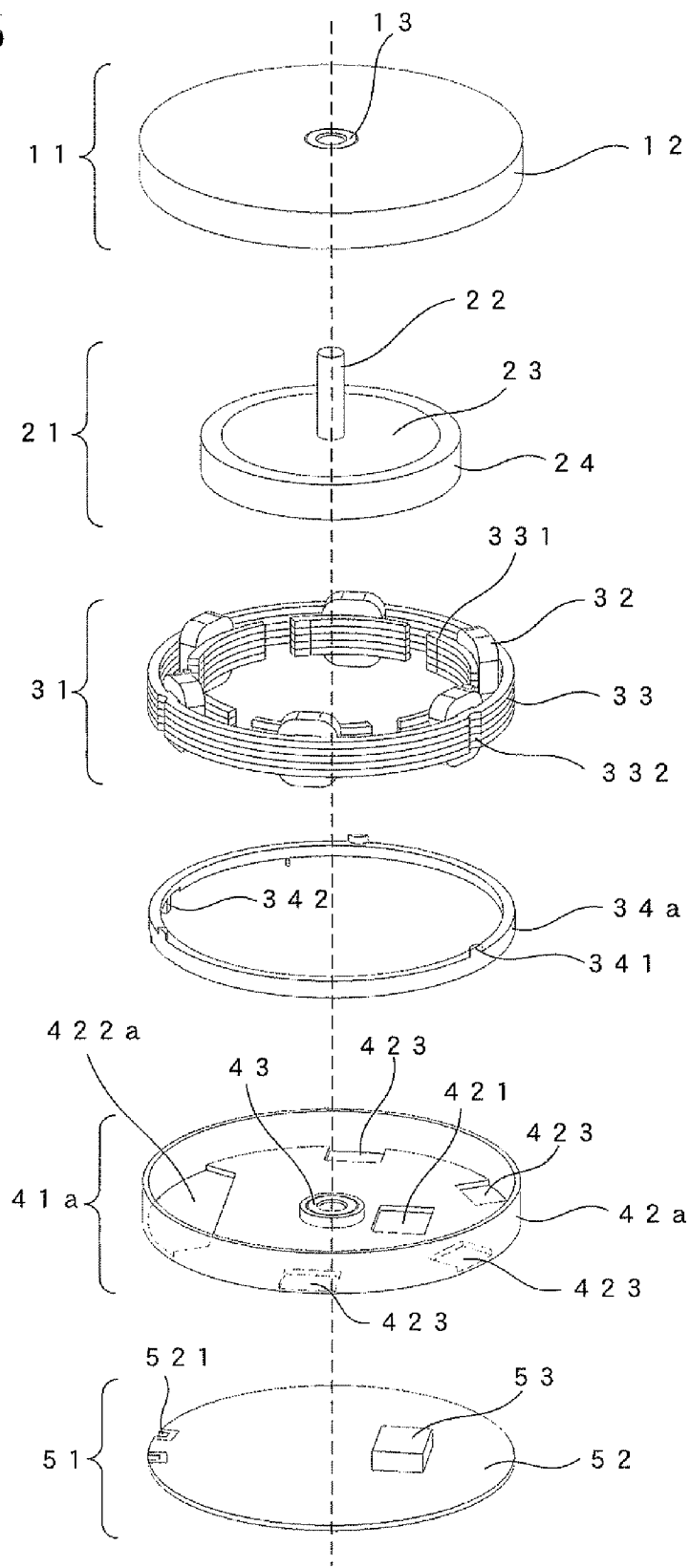
FIG. 6 is a perspective exploded view of the brushless DC motor according to the second embodiment.

Referring to FIGS. 5 and 6, the brushless DC motor 10a includes a spacer ring 34a and a case assembly 41a. The spacer ring 34a is structured basically the same as the spacer ring 34 of the first embodiment but has a smaller axial dimension than the spacer ring 34 by the thickness of the main plate of a case body 42a of the case assembly 41a, which contributes to further reducing the axial dimension of the brushless DC motor 10a compared to the brushless DC motor 10 according to the first embodiment, and at the same time which means that the axial dimension (that is the height of the annular wall) of the spacer ring 34a is smaller than the thickness of a winding layer of a coil 32 of a stator assembly 31 (refer to FIG. 5) and so the winding layer of the coil 32 is caused to partly protrude beyond the spacer ring 34a in the axial direction.

The case body 42a of the case assembly 41a includes, at its main plate, an opening 421 which has the same function as the opening 421 of the first embodiment, another opening 422a which has a larger area than the opening 422 of the first embodiment, and a plurality of still another openings 423 which are not provided in the first embodiment and thus unique to the second embodiment, wherein the openings 423 function to accommodate a part (specifically, outermost part protruding beyond the spacer ring 34*a*) of the wiring layer of the coils 32 thereby preventing the coils 32 from interfering with the case body 42*a*, and wherein the opening 422*a* functions to pass a first protrusion 342 of the spacer ring 34*a* and at the same time serves to act as one of the openings 423.

Also, the case body 42*a* has an annular wall height (=axial dimension) smaller, by the difference in axial dimension between the spacer ring 34 and the spacer ring 34*a*, than the annular wall height of the case body 42 of the brushless DC motor 10 according to the first embodiment.

In the brushless DC motor 10*a* structured as described above, the case body 42*a* can be located closer toward the stator assembly 31 by the thickness of the main plate of the case body 42*a* compared with the case body 42 of the brushless DC motor 10 according to the first embodiment, whereby the dimension of the brushless DC motor 10*a* can be further reduced with respect to the axial direction compared with the brushless DC motor 10 of the first embodiment. Accordingly, the brushless DC motor 10*a*, when designed to have the same axial dimension as the brushless DC motor 10 of the first embodiment, can include coils provided with increased number of windings and therefore can generate an increased torque.

The present invention has been described with respect to the specific embodiments. However, it is to be understood that the present invention is not limited to the embodiments described above but encompasses various modifications which fall within the spirit and scope of the present invention and which will occur to a person skilled in the art, wherein the advantages of the present invention also is not limited to those which are mentioned in the above description. The present invention can be practiced with various additions, alterations and partial omissions without departing from the spirit and scope of the present invention which can be derived from what is disclosed in the appended claims as well as from its equivalents.

What is claimed is:

1. A brushless DC motor comprising:
   (a) a housing including:
      a cup-shaped upper housing comprising a disk-like main plate, an annular wall, and a front bearing disposed at a center thereof; and
      a cup-shaped lower housing including a disk-like main plate provided with openings, an annular wall, and a rear bearing disposed at a center thereof;
   (b) a stator assembly disposed in the housing, comprising:
      a stator core having a plurality of pole tooth portions;
      a circular portion; and
      coils wound around each of the pole tooth portions,
      wherein the pole tooth portions radially extend from the circular portion;
   (c) a rotor assembly rotatably disposed in the stator assembly, comprising:
      a shaft;
      a sleeve attached around the shaft; and
      a magnet disposed on an outer periphery of the sleeve;
   (d) a spacer ring disposed in the lower housing of the housing,
      wherein the spacer ring is engaged with the stator core and disposed between the stator core and the main plate of the lower housing in an axially direction; and
   (e) a circuit board mounted with an IC component to control a driving current,
      wherein the circuit board is secured to an outer face of the main plate of the lower housing, and the IC component mounted on the circuit board protrudes into the lower housing through one of the openings formed at the main plate of the lower housing,
      wherein the sleeve has an annular recess portion in its surface facing the IC component, and a part of the IC component is housed with the annular recess portion, and
      wherein the stator core has a plurality of axially-extending recesses provided at an outer circumference thereof, and wherein the spacer ring is provided with a plurality of axial-extending protrusions at an upper side and a lower side thereof, the plurality of protrusions provided on the upper side of the spacer ring are engaged with the plurality of recesses of the stator core, and the plurality of protrusions provided on the lower side of the spacer ring are engaged with the circuit board through the other opening formed at the main plate of the lower housing.

2. The brushless DC motor according to claim 1, wherein the main plate of the lower housing is further provided with a plurality of openings to house a part of the coils.

* * * * *